(12) United States Patent
Maeda

(10) Patent No.: US 11,067,975 B2
(45) Date of Patent: Jul. 20, 2021

(54) RECOMMENDED MAINTENANCE NOTIFICATION SYSTEM

(71) Applicant: FANUC Corporation, Yamanashi (JP)

(72) Inventor: Kouji Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 540 days.

(21) Appl. No.: 15/355,183

(22) Filed: Nov. 18, 2016

(65) Prior Publication Data

US 2017/0146985 A1    May 25, 2017

(30) Foreign Application Priority Data

Nov. 20, 2015 (JP) .............................. JP2015-228178

(51) Int. Cl.
*G05B 23/02* (2006.01)

(52) U.S. Cl.
CPC ....... *G05B 23/027* (2013.01); *G05B 23/0272* (2013.01); *G05B 2219/32226* (2013.01); *Y02P 90/02* (2015.11)

(58) Field of Classification Search
None
See application file for complete search history.

(56) References Cited

U.S. PATENT DOCUMENTS

2003/0115510 A1   6/2003 Takayama
2005/0033527 A1   2/2005 Wada et al.
(Continued)

FOREIGN PATENT DOCUMENTS

CN    103249522 A    8/2013
CN    104375460 A    2/2015
(Continued)

OTHER PUBLICATIONS

Office Action in JP Patent Application No. 2015-228178, dated Jan. 16, 2018, 6pp.
(Continued)

*Primary Examiner* — Matthew E. Gordon
(74) *Attorney, Agent, or Firm* — Hauptman Ham, LLP

(57) ABSTRACT

First and second machine tools machine a workpiece and transmit machine status information each representing the status thereof to a server. A measurement device measures the workpiece machined by the first machine tool and transmits workpiece information representing a status of a defective workpiece to the server. The server includes a machining accuracy defect countermeasure database storing the status of the defective workpiece and a corresponding maintenance content, a machine status database storing the machine status information on the first and second machine tools, and a notification unit that extracts the maintenance content corresponding to the status of the defective workpiece when the status of the workpiece included in the workpiece information and the status of the defective workpiece included in the machining accuracy defect countermeasure database are similar to each other, and that outputs a notification recommending execution of the extracted maintenance content in the second machine tool when the machine status information on the first machine tool and the machine status information on the second machine tool are similar to each other.

6 Claims, 3 Drawing Sheets

(56) References Cited

U.S. PATENT DOCUMENTS

| | | | | |
|---|---|---|---|---|
| 2009/0228129 A1* | 9/2009 | Moyne | ............ | G05B 19/41865 |
| | | | | 700/102 |
| 2013/0253670 A1 | 9/2013 | Chung et al. | | |
| 2015/0142154 A1 | 5/2015 | Tiano | | |

FOREIGN PATENT DOCUMENTS

| | | | |
|---|---|---|---|
| CN | 104781740 A | 7/2015 | |
| JP | 2003-177815 A | 6/2003 | |
| JP | 2004268633 A | 9/2004 | |
| JP | 2004-334509 A | 11/2004 | |
| JP | 2005-301915 A | 10/2005 | |
| JP | 2009-192533 A | 8/2009 | |
| JP | 2011138251 A | 7/2011 | |
| JP | 2011-192201 A | 9/2011 | |
| JP | 2012-8974 A | 1/2012 | |

OTHER PUBLICATIONS

Office Action in CN Application No. 201611041267.0, dated Oct. 23, 2018, 12pp.

* cited by examiner

RECOMMENDED MAINTENANCE NOTIFICATION SYSTEM

RELATED APPLICATIONS

The present application claims priority to Japanese Patent Application Number 2015-228178, filed Nov. 20, 2015, the disclosure of which is hereby incorporated by reference herein in its entirety.

BACKGROUND OF THE INVENTION

1. Field of the Invention

The present invention relates to a recommended maintenance notification system and, in particular, to a system that recommends the execution of the maintenance of a machine tool.

2. Description of the Related Art

In order to avoid reduction in productivity due to the problems of machine tools, it is strongly requested that the maintenance of the machine tools be executed before the occurrence of the problems. Typically, such previous maintenance is executed as a periodical inspection on a prescribed date. In addition, in recent years, there have been proposed technologies in which, by using information on a problem occurring in an apparatus, the likelihood of the occurrence of the similar problem in other apparatuses of the same type is predicted in advance.

For example, Japanese Patent Application Laid-open No. 2011-138251 describes a technology in which, when a defect is detected in an apparatus, a monitoring server connected to a plurality of apparatuses searches for another apparatus that uses the same component under a similar environment predicts the likelihood of the occurrence of the defect in the other apparatus, and switches the other apparatus having the likelihood of the occurrence of the defect to a standby system.

In addition, Japanese Patent Application Laid-open No. 2004-268633 describes a technology in which a defect prediction server connected to a plurality of vehicles predicts whether a defect occurs in a defect prediction target vehicle in the near future using vehicle data before the occurrence of the defect acquired from a defective vehicle and notifies the client of the defect prediction target vehicle of a prediction result.

According to the configurations described in Japanese Patent Application Laid-open Nos. 2011-138251 and 2004-268633, feedback on information on a defect in an apparatus itself is given to the same type of other apparatuses to predict the occurrence of a problem. However, in the field of machine tools, the maintenance work of the machine tools is needed not only when a defect occurs in the machine tools themselves but also when a workpiece machined by the machine tools becomes defective.

Conventionally, in the field of machine tools, there have been performed inspections for reasons and maintenance work for the machine tools when a machining defect occurs in the machining tools. However, even where a plurality of machine tools machine the same type of workpieces under the same machining conditions to produce workpieces on a large scale, the likelihood of the occurrence of the same machining defect in other machines is not inspected. Under such conditions, it is estimated that the same machining defect is highly likely to occur also in other machine tools in a few days. If the problem remains unsolved, the mass production of defective workpieces or the suspension of machine tools during continuous machining is caused, which results in a concern about reduction in operating efficiency.

SUMMARY OF THE INVENTION

The present invention has been made in order to solve the above deficiencies and has an object of providing a recommended maintenance notification system that predicts the occurrence of a machining defect in a workpiece and recommends the maintenance of a machine tools.

An embodiment of the present invention provides a recommended maintenance notification system including: a first machine tool and a second machine tool that machine a workpiece according to a machining program; a measurement device that measures at least the workpiece machined by the first machine tool; and a server, wherein the first machine tool and the second machine tool transmit machine status information each representing a status thereof to the server, the measurement device transmits workpiece information representing a status of the workpiece that becomes defective after being machined by the first machine tool, to the server, the server includes a machining accuracy defect countermeasure database that represents a database in which an occurrence case of a machining defect and a countermeasure thereto are accumulated, the database storing a status of a defective workpiece and a corresponding maintenance content, a machine status database that stores the machine status information on the first machine tool and the second machine tool, and a notification unit that extracts the maintenance content corresponding to the status of the defective workpiece when the status of the workpiece included in the workpiece information and the status of the defective workpiece included in the machining accuracy defect countermeasure database are similar to each other, and that outputs a notification recommending execution of the extracted maintenance content in the second machine tool when the machine status information on the first machine tool and the machine status information on the second machine tool are similar to each other.

Another embodiment provides the recommended maintenance notification system in which the workpiece information includes the status of the workpiece and an identifier of the first machine tool, the machining accuracy defect countermeasure database includes the status of the defective workpiece, a monitored spot of a machine tool, and a maintenance content corresponding to the monitored spot, the machine status database includes the identifier of the first machine tool, a monitored spot of the first machine tool, a status of the monitored spot of the first machine tool, an identifier of the second machine tool, a monitored spot of the second machine tool, and a status of the monitored spot of the second machine tool, and the notification unit extracts the maintenance content corresponding to the status of the defective workpiece from the machining accuracy defect countermeasure database when the status of the workpiece included in the workpiece information and the status of the defective workpiece included in the machining accuracy defect countermeasure database are similar to each other and when the monitored spot of the first machine tool included in the machine status database and the monitored spot of the machine tool included in the machining accuracy defect countermeasure database match each other, extracts the identifier of the second machine tool when the monitored spot of the first machine tool and the monitored spot of the second machine tool match each other and the status of the monitored spot of the first machine tool and the status of the monitored spot of the second machine tool are similar to each other in the machine status database, and outputs the notification recommending the execution of the extracted maintenance content in the second machine tool represented by the identifier of the second machine tool.

Another embodiment provides the recommended maintenance notification system in which the status of the workpiece included in the workpiece information and the status of the defective workpiece included in the machining accuracy defect countermeasure database each include a measurement point and a measurement dimension, and the notification unit determines that the status of the workpiece included in the workpiece information and the status of the defective workpiece included in the machining accuracy defect countermeasure database are similar to each other when a difference in the measurement dimension at the measurement point falls within a prescribed threshold.

Another embodiment provides the recommended maintenance notification system in which the machine information database includes information for specifying a tool or a jig as the monitored spot of the first machine tool and the monitored spot of the second machine tool and includes used hours, the number of uses, a temperature, or a pressure of the tool or the jig as the status of the monitored spot of the first machine tool and the status of the monitored spot of the second machine tool, and the notification unit determines that the machine status information on the first machine tool and the machine status information on the second machine tool are similar to each other when a difference in the used hours, the number of uses, the temperature, or the pressure of the tool or the jig falls within a prescribed threshold.

Another embodiment provides the recommended maintenance notification system in which the server further includes a display unit that displays the notification from the notification unit.

Another embodiment provides the recommended maintenance notification system in which the second machine tool further includes a display unit that displays the notification from the notification unit.

Another embodiment provides a recommended maintenance notification system including: a machining accuracy defect countermeasure database that represents a database in which an occurrence case of a machining defect and a countermeasure thereto are accumulated, the database storing a status of a defective workpiece and a corresponding maintenance content; a machine status database that stores machine status information on a first machine tool and a second machine tool; and a notification unit that receives workpiece information representing a status of a workpiece that becomes defective after being machined by the first machine tool, that extracts the maintenance content corresponding to the status of the defective workpiece when the status of the workpiece included in the workpiece information and the status of the defective workpiece included in the machining accuracy defect countermeasure database are similar to each other, and that outputs a notification recommending execution of the extracted maintenance content in the second machine tool when the machine status information on the first machine tool and the machine status information on the second machine tool are similar to each other.

According to an embodiment of the present invention, it is possible to predict the occurrence of a machining defect in a workpiece and recommend the maintenance of a machine tool.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

Figure 1:
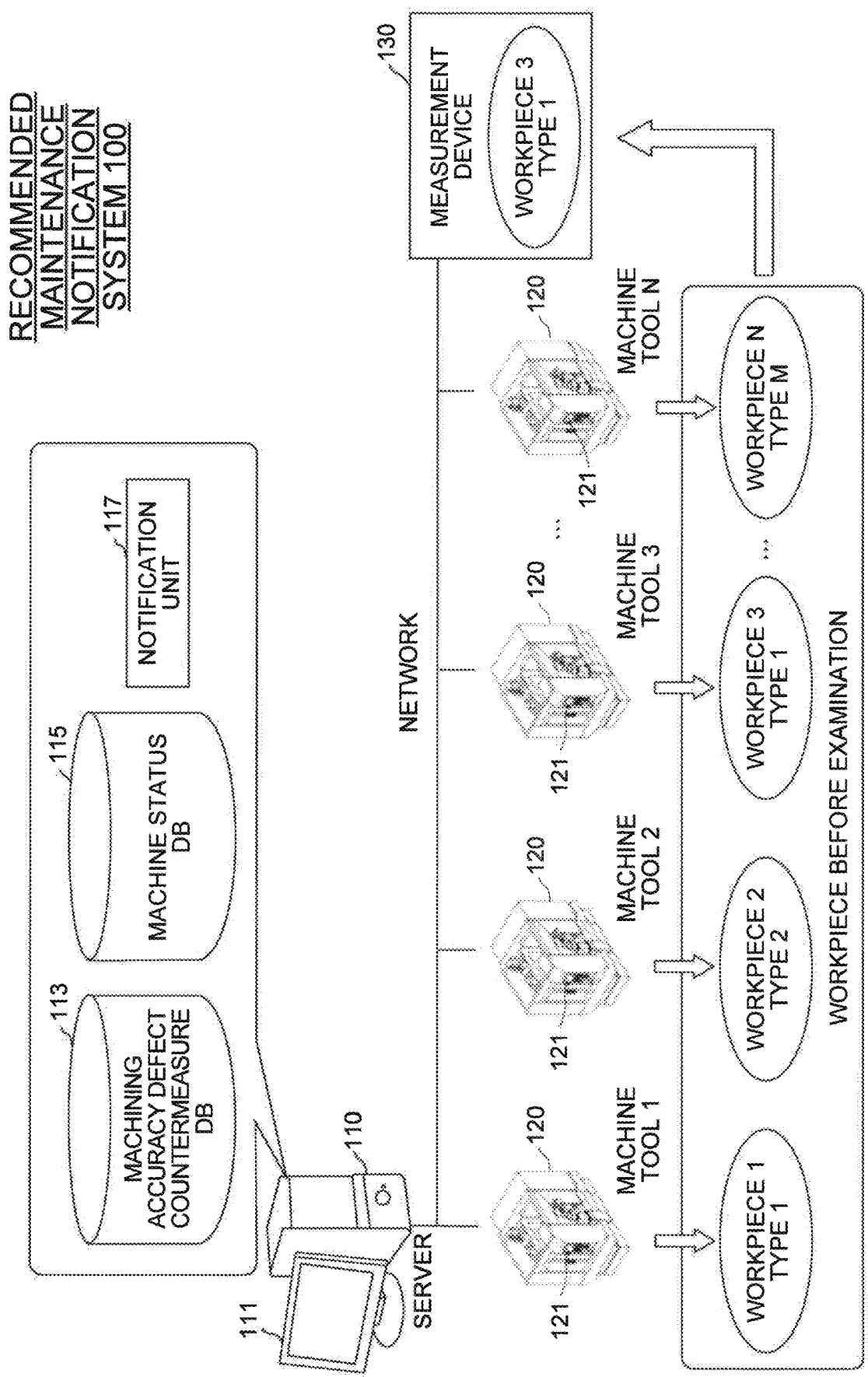
FIG. 1 is a schematic configuration diagram of a recommended maintenance notification system according to an embodiment of the present invention.

Hereinafter, a description will be given of an embodiment of the present invention with reference to the drawings. FIG. 1 is a diagram showing the configuration of a recommended maintenance notification system 100 according to the embodiment of the present invention.

The recommended maintenance notification system 100 includes a server 110, a plurality of machine tools 120, and a measurement device 130. The server 110, the plurality of machine tools 120, and the measurement device 130 are connected so as to be capable of communicating with each other via a network.

The machine tool 120 machines a workpiece. On this occasion, the machine tool 120 transmits information on its status (machine status information) to the server 110 as needed. The machine status information includes, for example, a tool type, used hours of a tool, a jig type, used hours of a jig, a coolant temperature, material information, or the like.

The measurement device 130 examines a workpiece machined by the machine tool 120. Examination items of a workpiece include, for example, a hole diameter at a prescribed measurement point, a dimension, a parallel or orthogonal dimension of a machined surface, or the like. The measurement device 130 transmits a machine ID (ID specifying the machine tool 120 that has machined a workpiece), a measurement point and a measurement value of the above examination items, a tool (a type of the tool used by the machine tool 120 to machine a workpiece), a jig (a type of the jig used by the machine tool 120 to machine a workpieces), or the like to the server 110 as workpiece information.

In addition, the measurement device 130 may determine the presence or absence of a machining defect in a workpiece. When a measurement value included in workpiece information exceeds a tolerance, the measurement device 130 determines that the workpiece is defective. In this case, the measurement device 130 may notify the server 110 of only the workpiece information on the defective workpiece.

The server 110 is typically a server computer, and performs prescribed machining in such a way that a central processing unit (CPU) reads and executes a program stored in a memory. The server 110 receives workpiece information from the measurement device 130. In addition, the server 110 monitors the plurality of machine tools 120 to collect machine status information and records the collected machine status information on a machine status DB 115. Besides, the server 110 has a machining accuracy defect countermeasure DB 113 and a notification unit 117.

Figure 2:
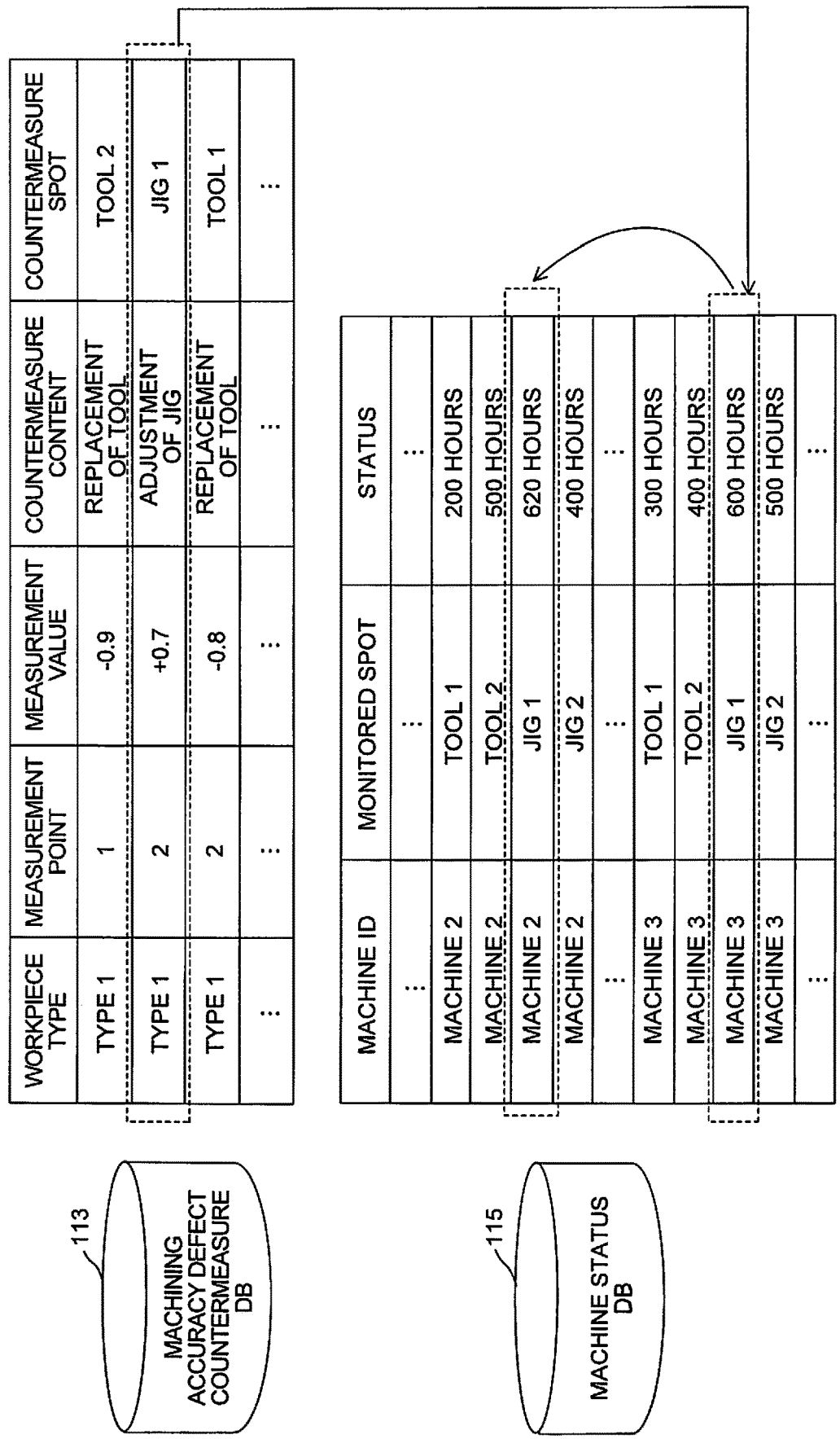
FIG. 2 is a diagram showing a configuration example of a database according to the embodiment of the present invention.

The machining accuracy defect countermeasure DB 113 is a storage unit that stores machining accuracy defect countermeasure information in which reasons for defective workpieces occurring in the past and matters arranged as countermeasures are associated with each other (FIG. 2). The machining accuracy defect countermeasure information includes, for example, workpiece types, measurement points, measurement values (defect values detected at the measurement points, for example, measurement values of hole diameters, parallelism, dimensions, or the like), countermeasure contents (contents of maintenance work for solving machining accuracy defects, for example, replacement of a tool, adjustment of a jig, or the like), and countermeasure spots (spots of the machine tools 120 causing reasons for machining defects, for example, tool types, jig types, or the like).

The machine status DB 115 is a storage unit that stores machine status information received from each of the plurality of machine tools 120 (FIG. 2). The machine status information includes, for example, information on a machine ID uniquely specifying a machine tool, a monitored spot (for example, a tool type, a jig type, or the like), and a status (status of a monitored spot, for example, used hours of a tool, used hours of a jig, or the like), or the like. Here, the monitored spot preferably includes a spot specified as a "countermeasure spot" in the machining accuracy defect countermeasure DB 113. The server 110 preferably receives the machine status information from the machine tool 120 as needed and updates the contents of the machine status DB 115 with newer information.

The notification unit 117 is a processing unit that presumes the machine tool 120 in which a machining defect is likely to occur in the future. First, the notification unit 117 determines whether workpiece information received from the measurement device 130 is equivalent to a machining defect. When a measurement value included in the workpiece information exceeds a tolerance, the notification unit 117 determines that the workpiece is defective. Note that when the measurement device 130 has already performed processing to transmit only workpiece information on a defective workpiece, the notification unit 117 does not need to determine whether the workpiece is defective. Hereinafter, the notification unit 117 performs the following processing only on workpiece information on a defective workpiece.

It is assumed that workpiece information on a defective workpiece received by the notification unit 117 from the measurement device 130 is a record A. The notification unit 117 verifies the record A against the machining accuracy defect countermeasure DB 113 to determine whether any machining defect similar to that of the defective workpiece occurring at this time has occurred in the past. Specifically, when a record (record B) having a measurement point matching that of the workpiece information on the defective workpiece, a tool type or a jig type matching that of the workpiece information on the defective workpiece, and a measurement value matching that of the workpiece information on the defective workpiece or falling within a prescribed tolerance exists in the machining accuracy defect countermeasure DB 113, the notification unit 117 extracts the record B as a similar machining defect occurring in the past. A "countermeasure spot" and an "countermeasure content" included in the record B are estimated as a reason for the occurrence of the defective workpiece at this time and needed maintenance work, respectively.

Next, the notification unit 117 extracts a record having the same "machine ID" as that of the record A and maintaining the same "countermeasure spot" as that of the record B as a "monitored spot" (record C) from the machine status DB 115. The record C is estimated as one briefly indicating a reason for the occurrence of the defective workpiece in any of the machine tools 120 at this time. Further, when the same status as that of the record C occurs also in another machine tool 120, it is estimated that the same machining defect is highly likely to occur also in the other machine tool 120.

As a result, the notification unit 117 extracts a record having the same "monitored spot" as that of the record C and a "status" matching that of the record C or falling within a tolerance from the machine status DB 115 (record D). A "machine ID" included in the record D represents the machine tool 120 in which a machining defect is highly likely to occur in the near future.

The notification unit 117 notifies a user of the machine ID. Typically, the notification unit 117 displays the "machine ID" or the like of the record D on a display device 111 provided in the server 110. Alternatively, the notification unit 117 may display a message or the like recommending maintenance work on a display device 121 provided in the machine tool 120 represented by the "machine ID" of the record D. In these cases, it is further preferable that the notification unit 117 display the "monitored spot" of the record D or the "countermeasure spot" of the record B and the "countermeasure content" of the record B. Thus, the user is allowed to be 14 notified of the machine tool in which a machining defect is highly likely to occur in the near future, a spot for which maintenance work is recommended, and the content of recommended maintenance work.

Figure 3:
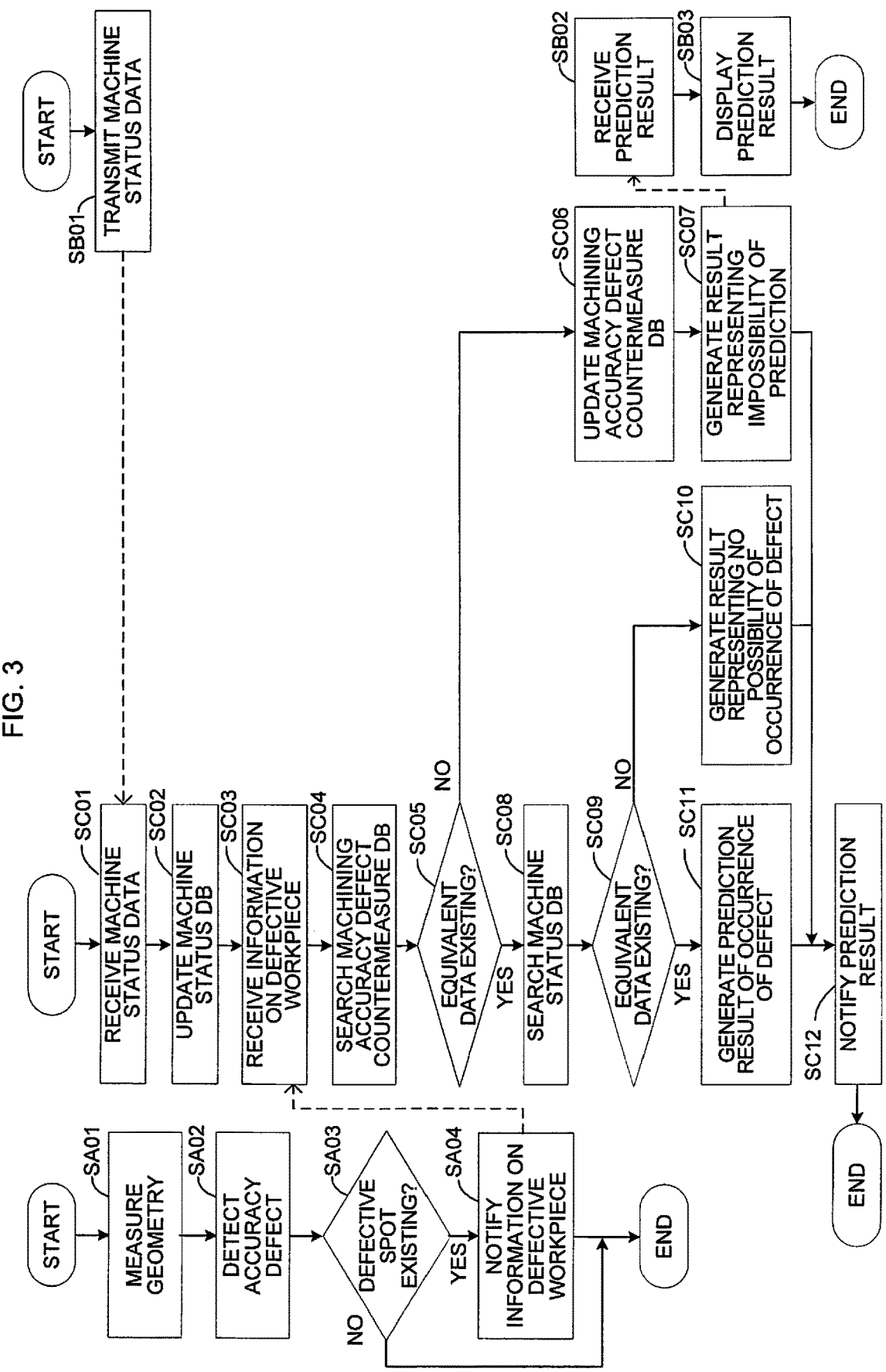
FIG. 3 is a flowchart showing the operation of the recommended maintenance notification system according to the embodiment of the present invention.

Next, a description will be given of an example of the operation of the recommended maintenance notification system 100 with reference to the flowchart of FIG. 3. In FIG. 3, element numbers starting with SA, element numbers starting with SB, and element numbers starting with SC represent the operation of the measurement device 130, the operation of the machine tool 120, and the operation of the server 110, respectively.

SB01: Transmission of Machine Status Data

The machine tool 120 machines a workpiece. On this occasion, the machine tool 120 transmits machine status information to the server 110 as needed. For example, the machine tool 120 is allowed to generate and transmit machine status information having "machine 3" as a "machine ID" "jig 1" as a "monitored spot" and "600 hours" as a "status." The machine tool 120 may generate a plurality of machine status information for one machine ID. For example, the machine tool 120 is allowed to generate and transmit machine status information representing the statuses of some tools or jigs.

SA01: Measurement of Geometry

The measurement device 130 examines the workpiece machined by the machine tool 120. The measurement device 130 measures, for example, a value such as a hole diameter at a prescribed measurement point, a dimension, and a parallel or orthogonal dimension of a machined surface.

SA02: Detection of Accuracy Defect

The measurement device 130 compares the measurement values of the respective measurement points with the fixed values of the respective measurement points maintained in advance. When the differences between the measurement values and the fixed values exceed tolerances maintained in advance, the measurement device 130 determines that the workpiece is defective.

SA03: Defective Spot Existing?

When it is determined in step SA02 that the workpiece is defective, the measurement device 130 transits to step SA04.

When it is determined that the workpiece is not defective, the measurement device 130 ends the processing.

SA04: Notification of Information on Defective Workpiece

The measurement device 130 transmits workpiece information on the workpiece (defective workpiece) determined to be defective to the server 110. For example, as shown in FIG. 2, the measurement device 130 is allowed to generate and transmit workpiece information having "machine 3" responsible for the machining of the defective workpiece as a "machine ID", "type 1" representing a workpiece type of the defective workpiece as a "workpiece type", "1" as a "measurement point", "+0.6" as a "measurement value", "tool 2" used to machine the defective workpiece as a "tool", and "jig 1" used to machine the defective workpiece as a "jig."

SC01: Reception of Machine Status Data

The server 110 receives the machine status information from the machine tool 120.

SC02: Update of Machine Status DB 115

The server 110 updates the machine status DB 115 with the machine status information received in step SC01. For example, in the machine status DB 115 shown in FIG. 2, a "machine ID" and a "monitored spot" are key factors. Accordingly, when the "machine IDs" match each other and the "monitored spots" match each other between the received machine status information and a record existing in the machine status DB 115, the server 110 updates the record with the received machine status information. When the matching record does not exist, the server 110 generates a new record in the machine status DB 115 using the received machine status information.

For example, when receiving the machine status information illustrated by an example in step SB01, the server 110 generates a record having "machine 3" as a "machine ID", "jig 1" as a "monitored spot", and "600 hours" as a "status" in the machine status DB 115 as shown in FIG. 2.

SC03: Reception of Information on Defective Workpiece

The server 110 receives the workpiece information generated in step SA04 (record A)

SC04: Search of Machining Accuracy Defect Countermeasure DB 113

The server 110 extracts a record having a "workpiece type", a "measurement point", and a "tool" or a "jig" matching those of the record A received in step SC03 and a measurement value matching that of the record A or falling within a prescribed tolerance from the machining accuracy defect countermeasure DB 113. For example, it is assumed that the range of the tolerance of the "measurement value" is set to be within ±0.1 in advance. In addition, it is assumed that the record A includes the contents illustrated by an example in step SA04. In this case, the server 110 is allowed to extract a record having "type 1" as a "workpiece type", "2" as a "measurement point", "+0.7" as a "measurement value", and "jig 1" as a "jig" from the machining accuracy defect countermeasure DB 113 shown in FIG. 2 (record B).

SC05: Equivalent Data Existing?

When the search of the machining accuracy defect countermeasure DB 113 for the record is allowed in step SC04, the server 110 transits to step SC08. On the other hand, when the search of the record is not allowed, the server 110 transits to step SC06.

SC06: Update of Machining Accuracy Defect Countermeasure DB 113

The server 110 adds a new record having the contents of the record A to the machining accuracy defect countermeasure DB 113. The added record is referred to when the same machining defect occurs in the future.

SC07: Generation of Result Representing Impossibility of Prediction

Here, a past case similar to the current defective workpiece does not exist, and a recommended maintenance content does not also exist. Accordingly, as a prediction result, the server 110 is allowed to generate, for example, a message representing the fact that a recommended maintenance content does not exist.

SC08: Search of Machine Status DB 115

The server 110 extracts a record having the same "machine ID" as that of the record A received in step SC03 and the same content as that of the "countermeasure spot" of the record B extracted in step SC04 as a "monitored spot" (record C) from the machine status DB 115. For example, the server 110 is allowed to extract a record having "machine 3" as a "machine ID," "jig 1" as a "monitored spot", and "600 hours" as a "status" from the machine status DB 115 shown in FIG. 2.

Next, the server 110 extracts a record having the same "monitored spot" as that of the record C and a "status" matching that of the record C or falling within a prescribed tolerance from the machine status DB 115 (record D).

For example, it is assumed that the range of the tolerance of the "status" is set to be within ±50 hours in advance. In this case, the server 110 is allowed to extract a record having "jig 1" as a "monitored spot", "620 hours" as a "status", and "machine 2" as a "machine ID" from the machine status DB 115 shown in FIG. 2.

SC09: Equivalent Data Existing?

When the extraction of the record D from the machine status DB 115 is allowed in step SC08, the server 110 transits to step SC11. On the other hand, when the extraction of the record D is not allowed, the server 110 transits to step SC10.

SC10: Generation of Result Representing No Possibility of Occurrence of Defect

Here, another machine tool 120 having a status similar to that of the machine tool 120 that has currently machined the defective workpiece does not exist, and the same machining defect is not likely to occur. Accordingly, the server 110 is allowed to generate, for example, a message representing the fact that the same machining defect is not likely to occur as a prediction result.

SC11: Generation of Prediction Result of Occurrence of Defect

The server 110 determines the "machine ID" included in the record D extracted in step SC08 to be the machine tool 120 in which the machining defect is highly likely to occur. Then, the server 110 recommends maintenance work represented by the "countermeasure content" of the record B extracted in step SC04 to the machine tool 120 concerned.

For example, based on the contents of the respective DBs shown in FIG. 2, the "status", i.e., the used hours of "jig 1" representing a "monitored spot" reaches "620 hours" in the machine tool 120 having "machine 2" as a "machine ID." Therefore, the server 110 generates a message recommending "adjustment of jig" as an "countermeasure content", i.e., maintenance work.

SC12: Notification of Prediction Result

The notification unit 117 transmits a notification including the fact that a machining defect is highly likely to occur and preferably the content of the recommended maintenance work to the machine tool 120 specified by the "machine ID" included in the record D extracted in step SC08.

SB02: Reception of Prediction Result

The machine tool 120 specified by the "machine ID" included in the record D extracted in step SC08 receives the notification from the server 110.

SB03: Display of Prediction Result

The machine tool 120 having received the notification displays the contents of the received notification on its display unit not shown. Thus, the machine tool 120 is allowed to recommend the maintenance work to the operator of the machine tool 120.

Note that instead of the processing of steps SC12, SB02, and SB03 or in addition to these processing, the notification unit 117 may display the message representing the fact that the machining defect is highly likely to occur in the machine tool 120 specified by the "machine ID" included in the record D and preferably the content of the recommended maintenance work on the display unit (not shown) of the server 110. Thus, the notification unit 117 is allowed to recommend the maintenance work to the operator of the server 110.

According to the embodiment, the server 110 causes the machining accuracy defect countermeasure DB 113 and the machine status DB 115 to work together to be allowed to give feedback on information on the machining accuracy of a workpiece machined by one machine tool 120 and develop recommended maintenance information to other machine tools 120. That is, by giving feedback on machining defect information on a workpiece having been released from the machine instead of information on the problem of the machine itself as in the related art to a production process, the server 110 is allowed to improve production efficiency.

In addition, according to the embodiment, it is possible to give feedback on machining defect information on a workpiece not only to the same type of machine tools 120 but also to various machine tools 120 that machine the same type of workpieces as recommended maintenance information. Accordingly, it is possible to improve production efficiency even in production sites where various machine tools 120 operate at the same time.

Note that the present invention is not limited to the above embodiment but may be appropriately modified within the scope of the present invention. For example, the configurations and the contents of the data of the machining accuracy defect countermeasure DB 113 and the machine status DB 115 are not limited to the above embodiment but may be, of course, appropriately modified so long as it is possible to achieve the scope of the present invention. That is, when a defective workpiece occurs, the database configuration may be appropriately modified so long as it is possible to specify a recommended maintenance content in a case in which the same defective workpiece occurs and specify other machine tools having a status similar to that of a machine tool in which the defective workpiece occurs.

For example, the above embodiment describes an example in which used hours of tools and jigs are used as the "statuses" of the machine status DB 115. However, the number of uses of jigs, hydraulic pressures put on jigs by which workpieces are held, cutting loads of tools, or the like may be used instead.

In addition, the above embodiment describes an example in which the notification unit 117 displays a message on various display units. However, a configuration in which an alert is issued by sound, light, or the like may be used.

The embodiment of the present invention is described above. The present invention is not limited to the examples of the above embodiment but may be carried out in other modes with appropriate modifications.

The invention claimed is:

1. A recommended maintenance notification system, comprising:
   a first machine tool and a second machine tool each configured to machine workpieces according to a machining program;
   a measurement device configured to measure a measurement dimension of the workpieces machined by the first machine tool at a measurement point; and
   a server, wherein
   the first machine tool is configured to transmit to the server a first machine status information representing a monitored spot and a status of the monitored spot of the first machine tool,
   the second machine tool is configured to transmit to the server a second machine status information representing a monitored spot and a status of the monitored spot of the second machine tool,
   the measurement device is configured to transmit to the server workpiece information representing the measurement point and the measurement dimension at the measurement point of a workpiece that has been defectively machined by the first machine tool,
   the server includes:
      a machining accuracy defect countermeasure database configured to store accumulated data including
         the measurement point and the measurement dimension at the measurement point of a plurality of previous defectively machined workpieces, and
         contents of maintenance representing a countermeasure spot and a countermeasure content corresponding to the measurement point and the measurement dimension at the measurement point of the plurality of previous defectively machined workpieces as countermeasures thereagainst;
      a machine status database configured to store the first and second machine status information, respectively; and
      a notification unit configured to, when the measurement dimension at the measurement point of the defectively machined workpiece included in the workpiece information transmitted from the measurement device and the measurement dimension at the measurement point of a previous defectively machined workpiece among the plurality of previous defectively machined workpieces included in the machining accuracy defect countermeasure database are determined to be similar to each other,
         extract the contents of maintenance corresponding to the measurement dimension at the measurement point of the previous defectively machined workpiece from the machining accuracy defect countermeasure database,
         extract the contents of maintenance corresponding to the monitored spot of the first machine status information having the same information as the countermeasure spot included in the extracted contents of maintenance, and
         output
            a first notification recommending execution of the extracted countermeasure contents at the countermeasure spot at the monitored spot in the second machine tool when the status of the monitored spot included in the first machine status information and the status of the monitored spot included in the second machine status information are determined to be similar to each other, and a second notification including a message that a same machining defect is not likely to occur when the status of the monitored spot included in the first machine status information and the status of the monitored spot included in the second machine status information are determined not to be similar to each other, the monitored spot of the first machine tool includes information specifying a tool or a jig of the first machine tool, the status of the monitored spot of the first machine tool includes a period of time of use, a number of times of use, a temperature, or a pressure of the tool or the jig of the first machine tool, the monitored spot of the second machine tool includes information specifying a tool or a jig of the second machine tool, the status of the monitored spot of the second machine tool includes a period of time of use, a number of times of use, a temperature, or a pressure of the tool or the jig of the second machine tool, and the notification unit is configured to determine that the measurement dimension at the measurement point of the defectively machined workpiece included in the workpiece information transmitted from the measurement device and the measurement dimension at the measurement point of the previous defectively machined workpiece included in the machining accuracy defect countermeasure database are similar to each other when a difference between the measurement dimension at the measurement point of the defectively machined workpiece included in the workpiece information and the measurement dimension at the measurement point of the previous defectively machined workpiece included in the machining accuracy defect countermeasure database falls within a prescribed threshold, and that the status of the monitored spot included in first machine status information and the status of the monitored spot included in the second machine status information are similar to each other when a difference between (i) the period of time of use, the number of times of use, the temperature, or the pressure of the tool or the jig of the first machine tool and (ii) the period of time of use, the number of times of use, the temperature, or the pressure of the tool or the jig of the second machine tool falls within a prescribed threshold.

2. The recommended maintenance notification system according to claim 1, wherein the server further includes a display unit configured to display at least one of the first notification or the second notification from the notification unit.

3. The recommended maintenance notification system according to claim 1, wherein the second machine tool further includes a display unit configured to display at least one of the first notification or the second notification from the notification unit.

4. A recommended maintenance notification system, comprising:

a machining accuracy defect countermeasure database configured to store accumulated data including a measurement point and a measurement dimension at the measurement point of a plurality of previous defectively machined workpieces that have been defectively machined, and contents of maintenance representing a countermeasure spot and a countermeasure content corresponding to the measurement point and the measurement dimension at the measurement point of the plurality of previous defectively machined workpieces as countermeasures thereagainst;

a machine status database configured to store a first machine status information representing a monitored spot and a status of the monitored spot of a first machine tool and a second machine status information representing a monitored spot and a status of the monitored spot of a second machine tool; and a notification unit configured to receive workpiece information representing the measurement point and the measurement dimension at the measurement point of a workpiece that becomes defective after being machined by the first machine tool, when the measurement dimension at the measurement point of the defective workpiece included in the received workpiece information and the measurement dimension at the measurement point of a previous defectively machined workpiece among the plurality of previous defectively machined workpieces included in the machining accuracy defect countermeasure database are determined to be similar to each other, extract the contents of maintenance corresponding to the measurement dimension at the measurement point of the previous defectively machined workpiece from the machining accuracy defect countermeasure database, and extract the contents of maintenance corresponding to the monitored spot of the first machine status information having the same information as the countermeasure spot included in the extracted contents of maintenance, and output a first notification recommending execution of the extracted countermeasure contents at the countermeasure spot at the monitored spot in the second machine tool when the status of the monitored spot included in the first machine status information and the status of the monitored spot included in the second machine status information are determined to be similar to each other, and a second notification including a message that a same machining defect is not likely to occur when the status of the monitored spot included in the first machine status information and the status of the monitored spot included in the second machine status information on the second machine tool are determined not to be similar to each other, wherein the monitored spot of the first machine tool includes information specifying a tool or a jig of the first machine tool, the status of the monitored spot of the first machine tool includes a period of time of use, a number of times of use, a temperature, or a pressure of the tool or the jig of the first machine tool, the monitored spot of the second machine tool includes information specifying a tool or a jig of the second machine tool, the status of the monitored spot of the second machine tool includes a period of time of use, a number of times of use, a temperature, or a pressure of the tool or the jig of the second machine tool, and the notification unit is configured to determine
that the measurement dimension at the measurement point of the defective workpiece included in the received workpiece information and the measurement dimension at the measurement point of the previous defectively machined workpiece included in the machining accuracy defect countermeasure database are similar to each other when a difference between the measurement dimension at the measurement point of the defectively machined workpiece included in the workpiece information and the measurement dimension at the measurement point of the previous defectively machined workpiece included in the machining accuracy defect countermeasure database falls within a prescribed threshold, and that the status of the monitored spot included in first machine status information and the status of the monitored spot included in the second machine status information are similar to each other when a difference between (i) the period of time of use, the number of times of use, the temperature, or the pressure of the tool or the jig of the first machine tool and (ii) the period of time of use, the number of times of use, the temperature, or the pressure of the tool or the jig of the second machine tool falls within a prescribed threshold.

5. The recommended maintenance notification system according to claim 1, wherein when the server determines that another machine tool having a status similar to the status of the first machine tool that has machined the defectively machined workpiece does not exist and the same machining defect is not likely to occur, the server is configured to generate a message representing a fact that the same machining defect is not likely to occur and the notification unit is configured to output the second notification of the message.

6. The recommended maintenance notification system according to claim 1, wherein upon receiving, at the server, the first machine status information and second machine status information,
the server is configured to update the first machine status information and second status information stored in the machine status database by using the received first machine status information and second machine status information.

* * * * *